United States Patent [19]

Watanabe et al.

[11] Patent Number: 5,673,923
[45] Date of Patent: Oct. 7, 1997

[54] SPLIT SEAL RING MADE OF SYNTHETIC RESIN HAVING CROSSED DIVERGING ENDS

[75] Inventors: Tsutomu Watanabe, Kyoto; Tatsuei Sakata, Kashiwazaki, both of Japan

[73] Assignee: Mitsubishi Jidosha Kogyo Kabushiki Kaisha, Tokyo, Japan

[21] Appl. No.: 685,784

[22] Filed: Jul. 24, 1996

Related U.S. Application Data

[63] Continuation of Ser. No. 423,758, Apr. 18, 1995, abandoned.
[51] Int. Cl.$^6$ ............................................. F16J 9/12
[52] U.S. Cl. ..................... 277/216; 277/217; 29/888.07
[58] Field of Search ............................ 277/9, 26, 216, 277/217, 220; 29/888.07, 888.076, 888.3

[56] References Cited

U.S. PATENT DOCUMENTS

| | | | |
|---|---|---|---|
| 2,766,085 | 10/1956 | Muller | 277/217 |
| 3,091,025 | 5/1963 | Zallea | 29/888.3 |
| 3,588,125 | 6/1971 | Mastromatteo | 277/26 |
| 3,811,166 | 5/1974 | Zabolotsky et al. | 29/888.3 |
| 3,999,894 | 12/1976 | Nakayama et al. | 277/26 |
| 4,957,212 | 9/1990 | Duck et al. | 277/217 |

OTHER PUBLICATIONS

G. Williams; The Automotive Engineer: "Piston Rings"; Aug. 1938.

*Primary Examiner*—Scott Cummings

[57] ABSTRACT

A a seal ring is made of a synthetic resin and has opposite ends. The seal ring has been imparted with shape-retentive property so that the seal ring is crossed at portions thereof located inside the opposite ends. The seal ring preferably has a smaller radius of curvature around the crossed portions and also around a portion thereof located diametrically opposite the crossed portions than around remaining portions thereof. Desirably, the seal ring may be in a substantially elliptic shape. The seal ring may preferably be symmetrical relative to a line extending between the crossed portions and a portion thereof located diametrically opposite the crossed portions.

5 Claims, 8 Drawing Sheets

SPLIT SEAL RING MADE OF SYNTHETIC RESIN HAVING CROSSED DIVERGING ENDS

This application is a continuation of application Ser. No. 08/423,758 filed on Apr. 18, 1995, now abandoned.

BACKGROUND OF THE INVENTION

1. Field of the Invention.

This invention relates to a seal ring made of a synthetic resin and having opposite ends. The term "seal ring made of a synthetic resin" may hereinafter be referred to as "resin-made seal ring" for the sake of brevity.

2. Description of the Related Art

In general, a piston, a rotating shaft, a reciprocating shaft or the like in an automotive vehicle or the like is provided with one or more seal rings to enhance the tightness of a contacting portion thereof with an associated surface.

Various resin-made seal rings are shown in FIG. 3A to FIG. 3C, respectively. These resin-made seal rings will be described hereinafter.

Referring first to FIG. 3A, a resin-made seal ring 10 shown in FIG. 3A is of a popular type and has opposite ends 2A,2B. As shown, for example, in FIGS. 4 and 5, this resin-made seal ring 10 is assembled in an oil pump assembly 17 arranged in an automatic transmission (AT). The oil pump assembly 17 is provided with a shaft 5 which is inserted in a bore 4A of a housing (hereinafter called "AT housing") 4 of the automatic transmission. Two ring grooves 3 are formed in a peripheral wall of the shaft 5 of the oil pump assembly 17. The seal ring 10 is fitted in each ring groove 3.

FIG. 4 is a fragmentary perspective view of the oil pump assembly 17 with the seal rings 10 fitted on the shaft 5, as mounted on the AT housing 4. Fitting of the seal rings 10 as shown in this example ensures sufficient fluid tightness for hydraulic passages in the AT housing 4.

The seal ring 10 depicted in FIG. 3A is provided, as described above, with the opposite ends 2A,2B which are in abutment against each other, whereby the seal ring 10 is in a substantially true circular shape. It is to be noted that the diameter (inner diameter) of an inner peripheral wall of the seal ring is somewhat greater than the diameter of a bottom wall of the ring groove 3 in which the seal ring 10 is to be fitted.

As a material for the resin-made seal ring 10, a synthetic resin such as tetrafluoroethylene resin material (for example, "Teflon"®) is used. This resin material has adequate softness and flexibility.

Owing to the softness and flexibility of such a resin material, it is possible to widen or open the seal ring 10 at the opposite ends 2A,2B and then to fit it in the ring groove 3 of the oil pump assembly 17.

A description will now be made of a relationship between the seal ring 10 and the ring groove 3. As has been described above, the inner diameter of the seal ring 10 is somewhat greater than the diameter of the bottom wall of the ring groove 3, in other words, a radial space is formed between the seal ring 10 and the bottom wall of the ring groove 3, so that the seal ring 10 can move as much as the width of the space in the radial direction. Further, a small space is also formed in an axial direction between the seal ring 10 and each side wall of the ring groove 3, so that the seal ring 10 can also move in the axial direction.

These radial and axial spaces are indispensable upon adoption of such a resin-made seal ring as in the present invention, because sealing is achieved as shown in FIG. 7, namely, by introducing a low fluid pressure (about 1 kgf/cm$^2$) into the radial and axial spaces and pressing the seal ring under the pressure against the side wall of the ring groove 3 and the inner peripheral wall of the housing 4. Upon fitting the seal ring 10, the ring 10 is coated with paraffin wax to improve the fittability.

It is for the following reasons that the seal ring 10 is coated with paraffin wax.

As there is the radial space between the seal ring 10 and the bottom wall of the ring groove 3 as mentioned above, the seal ring 10 is movable as much as the radial width of the space. Upon fitting the seal ring 10, the seal ring 10 is widened or opened at the opposite ends 2A,2B. As a result, the seal ring 10 is caused to yield at a portion indicated by letter A in FIG. 1B so that the seal ring 10 is deformed into an elliptic shape.

The sum of the distance of the movement in or across the radial space and the extent of the elliptic deformation upon deformation into the elliptic shape is the protrusion illustrated in FIG. 6 (the protrusion=the distance of movement+the extent of elliptic deformation).

If this protrusion becomes greater than a chamfer dimension (i.e., the radial thickness of a chamfered portion 4A-1) of the housing 4 as indicated by broken lines in FIG. 6, there is the potential problem that upon assembly, the seal ring 10 may be pushed against a corner 4A-2 of the chamfered portion 4A-1 and hence damaged. Any attempt to absorb even the below-described ellipticity within the chamber dimension set taking into consideration radial movements of the seal ring 10 across or in the radial space, however, results in the need for an enlargement of the housing 4 and is accordingly impractical. Further, it is practically impossible to reduce the radial space because a radial space of a certain radial width is needed to allow a resin-made seal ring to exhibit sealing effects and also to absorb relative off-centering or eccentricity between the bore 4A of the housing 4 and the bottom wall of each ring groove 3 of the shaft 5. Incidentally, the term "ellipticity" as used herein means the length obtained by subtracting the length of a minor axis from the length of a major axis upon fitting the seal ring.

Accordingly, the seal ring 10 is coated with paraffin wax on both side walls thereof (namely, the walls defining the axial spaces between themselves and their opposite side walls of the ring 3 groove). By the adhesion of the paraffin wax, the radial movement is minimized to make the protrusion from the ring groove 3 substantially uniform so that the protrusion can be controlled within the chamfer dimension. It is however impossible to reduce the yield-associated elliptic deformation.

When the paraffin wax is melted away under heat during a performance test of an automatic transmission subsequent to its assembly, the outer diameter of the seal ring 10 increases while its inner diameter decreases, both owing to the low fluid pressure at the time of its use as described above. As a consequence, a sufficient sealing pressure is assured. Described specifically, owing to the soft and flexible properties of the tetrafluoroethylene resin material, the seal ring 10, when exposed to the fluid pressure, is pressed against the inner peripheral wall of the AT housing 4 and also the side wall of the ring groove 3 of the shaft 5. As a result, fluid tightness is assured between the shaft 5 of the oil pump assembly 17 and the AT housing 4.

For a piston, a reciprocating shaft or the like, the resin-made seal ring 10 (will hereinafter be called "the paraffin-coated ring 10") can be fitted in a similar manner. In the above example, paraffin wax was used to temporarily fix and hold the ring 10 in the ring groove 3. Grease, vaseline or the like can be used equally as an alternative.

A description will next be made of shape-retentive seal rings 11,11' shown in FIGS. 3B and 3C, respectively. These shape-retentive seal rings 11,11' are made of a synthetic resin. Each of the shape-retentive seal rings 11,11' has been imparted with shape-retentive property so that as its shape before fitting, portions inside opposite ends 2A,2B thereof are overlapped. Described specifically, in the case of the seal ring 11 shown in FIG. 3B, the portions inside the opposite ends 2A,2B are overlapped over a length $L_2$ so that the portion on a side of the end 2A lies radially inside the portion on a side of the end 2B. In the case of the seal ring 11' depicted in FIG. 3C, on the other hand, the portions inside the opposite ends 2A,2B are overlapped over a length $L_3$ so that as viewed in the drawing, the portion on a side of the end 2A lies above the portion on a side of the end 2B. As these shape-retentive resin-made ring seals 11,11' are the same except for the above difference, a further description will be made solely of the seal ring 11 shown in FIG. 3B.

The seal ring 11 is in a substantially true circular form. The diameter (inner diameter) of the inner wall of the seal ring 11 is smaller, by a degree corresponding to the overlapped length between the portions inside the opposite ends 2A,2B, than the diameter of the bottom wall of the ring groove 3 in which the seal ring 11 is to be fitted.

A material employed for the seal ring 11 is generally a synthetic resin such as a tetrafluoroethylene resin material (for example, "Teflon®") as in the case of the above-described paraffin-coated ring 10, because this resin has adequate softness and flexibility and can be imparted with shape-retentive property by simple heat treatment.

Owing to these properties of the resin material, the shape-retentive resin-made seal ring 11 is produced and fitted as will be described next.

After producing the ring portion in a manner known per se in the art, the ring portion is heat-treated by a heater to impart shape-retentive property so that the end portions are overlapped.

Owing to the shape-retentive property so imparted to the seal ring 11, the seal ring 11, when widened or opened at the opposite ends 2A,2B and fitted in the ring groove 3, acts as will be described below. As the seal ring 11 has been fitted in the ring groove 3 whose diameter is greater than that of the seal ring 11 before its fitting, the thus-fitted seal ring 11 tightly surrounds the bottom wall of the ring groove 3 so that the seal ring 11 is temporarily fixed and held on the bottom wall.

The oil pump assembly 17 with the seal ring 11 temporarily fixed in the oil groove 3 is then inserted into the AT housing 4. As a result, this insertion can be conducted smoothly so that the resistance to the seal ring 11 can be reduced.

After the oil pump assembly 17 has been inserted in the AT housing 4 as described above, the outer and inner diameters of the seal ring 11 are allowed to increase and decrease, respectively, under a low fluid pressure applied upon use of the automatic transmission as in the case of the above-described paraffin-coated ring 10 so that a sufficient sealing pressure is assured.

For pistons, rotating shafts, reciprocating shafts or the like, the resin-made seal ring 11 and 11' can be fitted in a similar manner.

Although the above-described paraffin-coated ring 10 can avoid a reduction in the fittability, the actual ring fitting work is very inefficient, leading to an increase in the manufacturing cost of a product. It is accompanied by another problem that, when the temperature becomes high as in summer, the viscosity of paraffin wax itself is lowered and the paraffin wax can no longer perform its function.

As a further problem, seal rings may stick together if they are coated with paraffin wax and are then left over prior to their fitting when the temperature is high as mentioned above. When the temperature becomes low as in winter, there is a further problem that its fittability into the ring groove 3 is deteriorated due to hardening of the paraffin wax.

In the case of the shape-retentive resin-made seal ring 11 or 11', on the other hand, the seal ring 11 or 11' is widened or opened at the opposite ends thereof like the above-described paraffin-coated ring 10 upon its fitting in the ring groove 3 in expectation of deformation into an elliptic shape through yielding. Therefore, the seal ring 11 or 11' takes, for example, such a form as shown in FIG. 1B so that the seal ring 11 or 11' is also caused to yield in the proximity of the point A. This results in an elliptic shape even when fitted in the ring groove 3.

Namely, elliptic deformation cannot be avoided like the paraffin-coated ring 10 although, as is illustrated in FIGS. 8A and 8B, radial movements can be prevented (in other words, coating of paraffin wax is not required) as the seal ring 11 or 11' is fixed and held on the bottom wall of the ring groove 3 at a position around an abutment, namely a closed portion 12 of the seal ring (i.e., a ring portion where the opposite ends 2A and 2B confront each other) and also at another position around a ring portion located diametrically opposite the closed portion 12. When the elliptic deformation takes place to a substantial extent, the resulting protrusion m of the seal ring 11 or 11' becomes greater than the dimension n of the chamfered portion 4A-1 of the housing 4 (see FIG. 6). Upon assembly, the ring 11 or 11' therefore is pushed against the corner 4A-2 of the chamfered portion 4A-1 and is hence damaged. The potential problem of impairment of the sealing function therefore still remains unsolved.

To avoid such a situation that, as shown in FIG. 6, the seal ring 11 or 11' is pushed against the corner 4A-2 of the chamfered portion 4A-1 and is hence damaged, it may be contemplated to increase the chamfer dimension of the above-described chamfered portion 4A-1 of the associated housing 4 to protect the seal ring 11 or 11' from damage upon insertion. This however requires to make the housing 4 greater as a whole, leading to the problem that the apparatus so assembled unavoidably becomes large.

SUMMARY OF THE INVENTION

With the foregoing problems in view, the present invention has as a primary object the provision of a seal ring made of a synthetic resin, which is designed to avoid damage by reducing its elliptic deformation, which occurs when the seal ring is fitted on a shaft, without using a coating material such as paraffin wax and hence ensuring the seal ring to contact a chamfered portion of an associated housing.

In a first aspect of the present invention, there is thus provided a seal ring made of a synthetic resin and having opposite ends, wherein the seal ring has been imparted with shape-retentive property so that the seal ring is crossed at portions thereof located inside the opposite ends.

Here, it is preferred to form the radius of curvature is smaller around the crossed portions and also around a portion of the seal ring located diametrically opposite the crossed portions than around remaining portions thereof. Further, it is preferred to form the seal ring in a substantially elliptic shape.

The seal ring may be formed symmetrically relative to a line extending between the crossed portions and a portion thereof located diametrically opposite the crossed portions.

In the first aspect of the present invention, the resin-made seal ring is imparted with shape-retentive property so that the seal ring is crossed at portions thereof located inside the opposite ends. It can therefore retain a shape very close to a true circle even after it has been fitted in the ring groove by widening it at the opposite ends, in other words, even in a state after the seal ring has been subjected to deformation upon assembly. The protrusion of the seal ring from the ring groove can therefore be limited to an optimal value. This has made it possible to achieve a sure seal-ring-protecting effect in a simple manner and moreover, to such an extent as available from the use of a coating material like paraffin wax or the like.

By making the radius of curvature smaller around the crossed portions and their diametrically opposite portion, the seal ring is imparted with shape-retentive property so that the seal ring is crossed at portions thereof located inside the opposite ends. The formation of the seal ring in this manner has the advantageous effect that a seal-ring-protecting effect can be obtained simply but surely.

When the seal ring is formed into a substantially elliptic shape, the seal ring has an overall shape very close to a true circle even after the seal ring has been widened at the opposite ends thereof, in other words, has been caused to yield. This makes it possible to limit the protrusion of the seal ring to an optimal value and also to facilitate the assembling work.

The symmetrical formation of the seal ring relative to the line extending between the crossed portions and their diametrically opposite portion allows the seal ring to have a substantially true circular shape even when fitted in the ring groove.

In a second aspect of the present invention, there is also provided a seal ring made of a synthetic resin and having opposite ends, wherein the seal ring has been imparted with shape-retentive property so that the seal ring is crossed at portions thereof located inside the opposite ends to have a substantially elliptic shape in a state not fitted in an intended ring groove but to have a substantially true circular shape in a state fitted in the intended ring groove and that in the state not fitted in the intended ring groove, the seal ring has a smaller radius of curvature around the crossed portions and also around a portion thereof located diametrically opposite the crossed portions than around remaining portions thereof.

In the second aspect of the present invention, the resin-made seal ring is imparted with shape-retentive property so that the seal ring is crossed at portions thereof located inside the opposite ends and the seal ring has a smaller radius of curvature around the crossed portions and their diametrically opposite portion than around the remaining portions thereof. As a result, the seal ring has a substantially elliptic shape in a state not fitted in an intended ring groove but to have a substantially true circular shape in a state fitted in the intended ring groove. When the seal ring is fitted in the ring groove, it has a substantially constant radius of curvature, namely, takes a shape close to a true circle so that it can surely exhibit sealing performance.

In a third aspect of the present invention, there is also provided a seal ring made of a synthetic resin and suited for use in a form fitted in a ring groove formed in a peripheral wall of a shaft to be inserted into a bore with an outwardly flared inlet portion, wherein:

the seal ring has opposite end portions; and the seal ring has been imparted with shape-retentive property so that the seal ring is crossed at portions thereof located inside the opposite ends to have a substantially elliptic shape in a state not fitted in an intended ring groove but to have a substantially true circular shape in a state fitted in the intended ring groove.

It is preferred to form the radius of curvature smaller around the crossed portions and their diametrically opposite portion than around remaining portions thereof. It is also preferred to form the seal ring symmetrically relative to a line extending between the crossed portions and their diametrically opposite portion.

In the third aspect of the present invention, the resin-made seal ring is imparted with shape-retentive property so that the seal ring is crossed at portions thereof located inside the opposite ends. The seal ring has a substantially elliptic shape in a state not fitted in an intended ring groove but to have a substantially true circular shape in a state fitted in the intended ring groove. When this seal ring is fitted in the ring groove formed in the peripheral wall of the shaft, this shaft can be smoothly inserted into the bore of the housing through the flared inlet portion thereof.

When the seal ring is formed at a smaller radius of curvature around the crossed portions and their diametrically opposite portion than around the remaining portions, the seal ring can be easily formed into a substantially elliptic shape when not fitted in the ring groove.

By forming the seal ring symmetrically relative to the line extending between the crossed portions and their diametrically opposite portion, the seal ring can be formed into a substantially true circular shape when fitted in the ring groove.

BRIEF DESCRIPTION OF THE DRAWINGS

FIG. 1A to FIG. 1C all show a shape-retentive resin-made seal ring according to one embodiment of the present invention, in which FIG. 1A shows the shape-retentive resin-made seal ring having a substantially elliptic shape in a state not fitted in a groove, FIG. 1B illustrates the shape-retentive resin-made seal ring in a state windened at opposite ends thereof to be fitted in a ring grove, and FIG. 1C depicts the shape-retentive resin-made seal ring in the form of a true circle after being fitted in the ring groove;

DETAILED DESCRIPTION OF THE PREFERRED EMBODIMENT

Figure 1A:
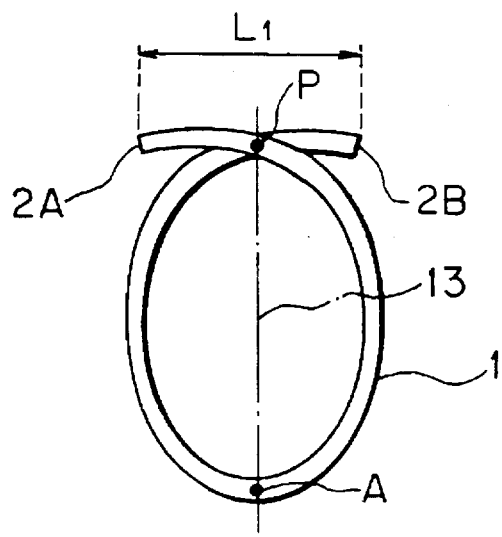
Figure 1B:
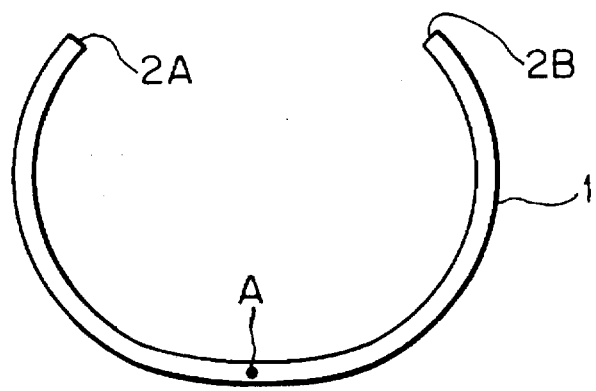
Figure 1C:
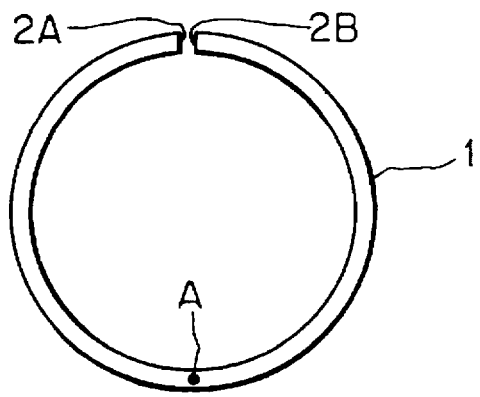

A preferred embodiment of the present invention will hereinafter be described with reference to some of the accompanying drawings. As is illustrated in FIGS. 1A to 1C, the resin-made seal ring 1 according to the embodiment of the present invention has opposite ends 2A,2B. The seal ring i has been imparted with shape-retentive property so that, as is shown in FIG. 1A, portions located inside the opposite ends 2A,2B are crossed at a point P.

Figure 4:
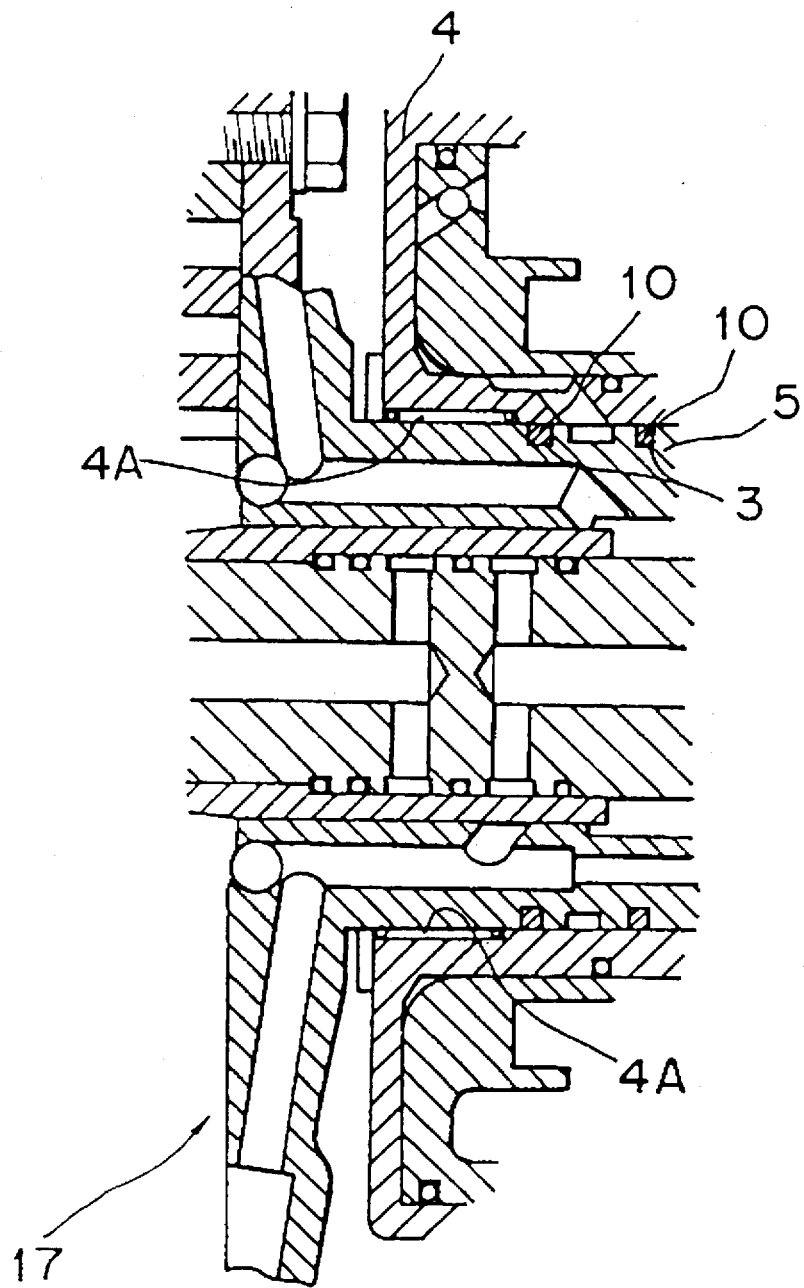
FIG. 4 is a fragmentary cross-sectional view of an automatic transmission.
Figure 5:
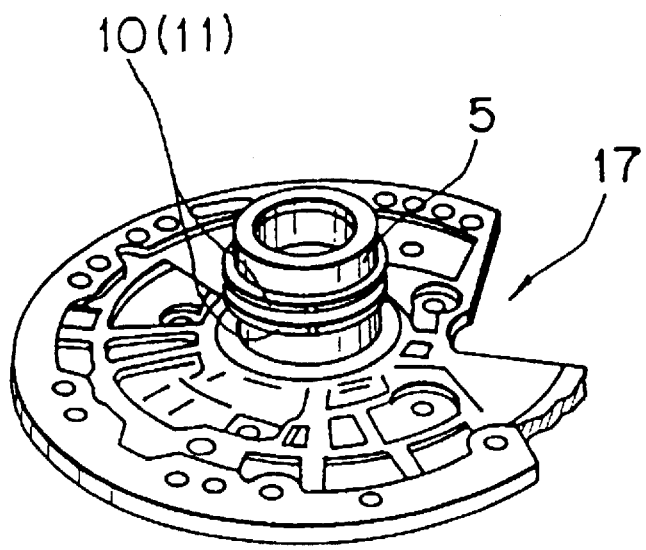
FIG. 5 is a perspective view of an oil pump assembly arranged in the automatic transmission of FIG. 4.

This resin-made seal ring 1 is used in place of the seal rings 10,11, which are shown in FIGS. 4 and 5, for the oil pump assembly 17 in such an automatic transmission as shown in FIG. 4.

Namely, this seal ring 1 is fitted in each ring groove 3 of the oil pump assembly 17 like ordinary seal rings. As a result, sufficient tightness is obtained between the shaft 5 of the oil pump assembly 17 and the AT housing 4 so that high fluid tightness is achieved for working oil. This makes it possible to surely feed a hydraulic pressure to a multiplate clutch.

As a material for this seal ring 1, synthetic resin such as a tetrafluoroethylene resin material is used like conventional seal rings. Before the shape-retentive property is imparted by heat treatment, the seal ring 1 has substantially the same shape as the ring groove 3. After the shape-retentive property has been imparted, an inner wall of the seal ring 1 along a major axis thereof has a diameter somewhat smaller than the diameter of the bottom wall of the ring groove 3.

The seal ring 1 has been imparted so that, as mentioned above, the portions inside the opposite ends 2A,2B are crossed at the point P. Upon imparting this shape-retentive property, the seal ring 1 is shaped to have a smaller radius of curvature at the point A, in other words, to have an elliptic shape before the seal ring 1 is fitted on the shaft 5 as shown in FIG. 1A.

Described specifically, the radius of curvature of the inner wall of the seal ring 1 is formed to become the smallest around a position located diametrically opposite the point P (namely, around the point A). The radius of curvature gradually becomes greater from the point A toward the point P in left and right directions to positions shifted over approximately 90° in phase. From these positions to the opposite ends 2A,2B, the seal ring 1 is formed with substantially the same radius of curvature.

As is illustrated in FIG. 1A, the seal ring 1 is formed symmetrically relative to a line 13 extending between the point P and the point A.

As is understood from the construction described above, the seal ring 1 is fitted in the following manner as the shape-retentive property has been imparted as described above.

First, the seal ring 1 is, as is illustrated in FIG. 1B, widened at the opposite ends 2A,2B like usual rings. Since the seal ring 1 has been imparted with shape-retentive property to have the elliptic shape, the seal ring 1 can be fitted as a whole in a shape very close to a true circle on the shaft 5 as illustrated in FIG. 1C even if the seal ring 1 has been caused to yield around the point A. The protrusion of the seal ring 1 can therefore be limited to an optimal value, and the assembly work of the shaft 5 of the oil pump assembly 17 in the AT housing 4 can be facilitated.

Figure 2:
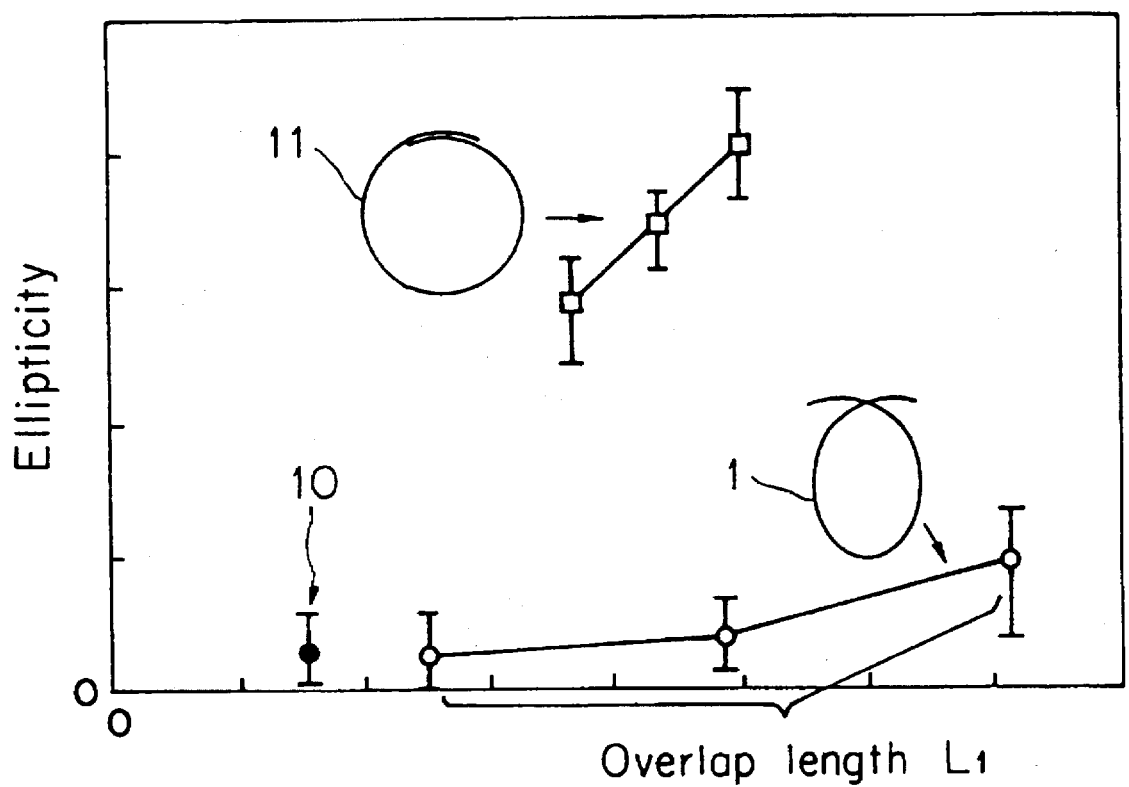
FIG. 2 diagrammatically illustrates a relation between an overlap length and ellipticity of the shape-retentive resin-made seal ring according to the one embodiment of the present invention.
Figure 3A:
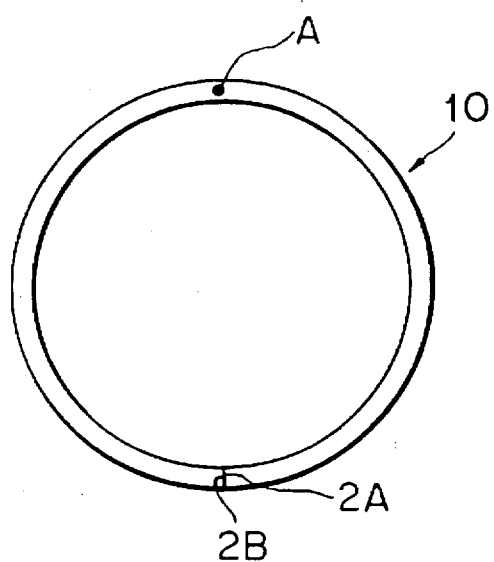
FIG. 3A to FIG. 3C depict resin-made seal rings, respectively, which do not fall within the scope of the present invention.
Figure 3B:
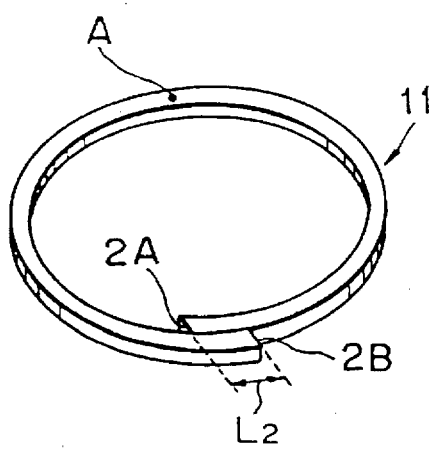
Figure 3C:
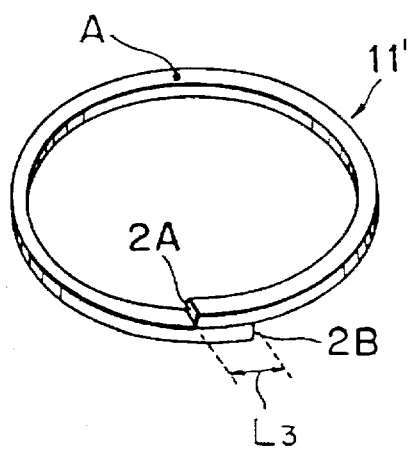

In this case, a smaller overlap length (i.e., the length $L_1$ between the opposite ends 2A and 2B set by imparting the shape-retentive property) makes it possible to achieve smaller ellipticity. If the overlap length however becomes too small, the seal ring 1 cannot be fixed or held well in the ring groove 3. Depending on the location where the seal ring 1 is to be fitted, the seal ring 1 is imparted with shape-retentive property to have an overlap length $L_1$ in a range shown in FIG. 2.

Figure 6:
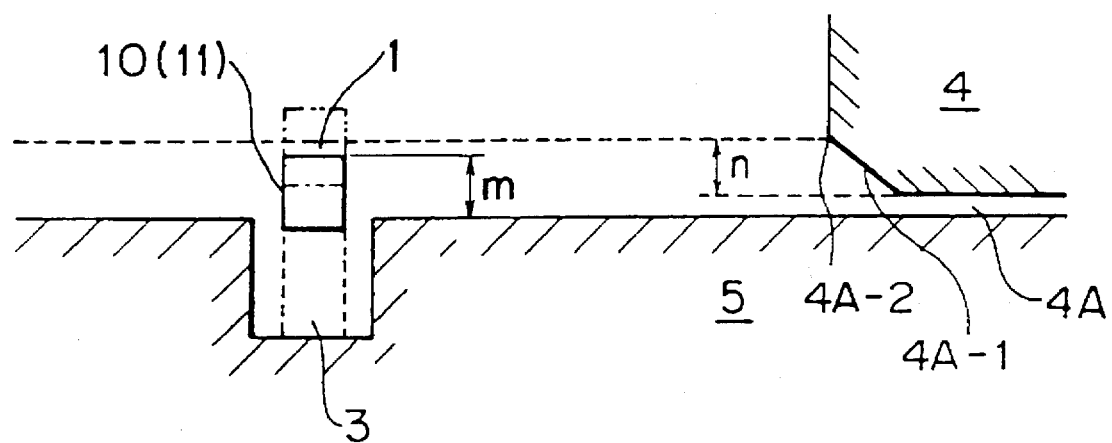
FIG. 6 shows a relation between the extent of a protrusion of a resin-made seal ring and a chamfered portion of an associated housing.

As a result, the protrusion m of the seal ring 1 upon insertion of the oil pump assembly 17 becomes smaller than the dimension n of the chamfered portion 4A-1 of the AT housing 4 as shown in FIG. 6. Owing to the guiding action of the chamfered portion 4A-1, the oil pump assembly 17 can be smoothly assembled in the AT housing 4 so that the seal ring 1 can be protected from damage.

Subsequent to the insertion of the oil pump assembly 17 in the AT housing 4, the resulting automatic transmission is operated. Upon its operation, the seal ring 1 is exposed to a low fluid pressure so that owing to the softness and flexibility of the tetrafluoroethylene resin material, the outer and inner diameters of the seal ring 1 are caused to increase and decrease, respectively, to produce a sufficient sealing pressure.

Figure 7:
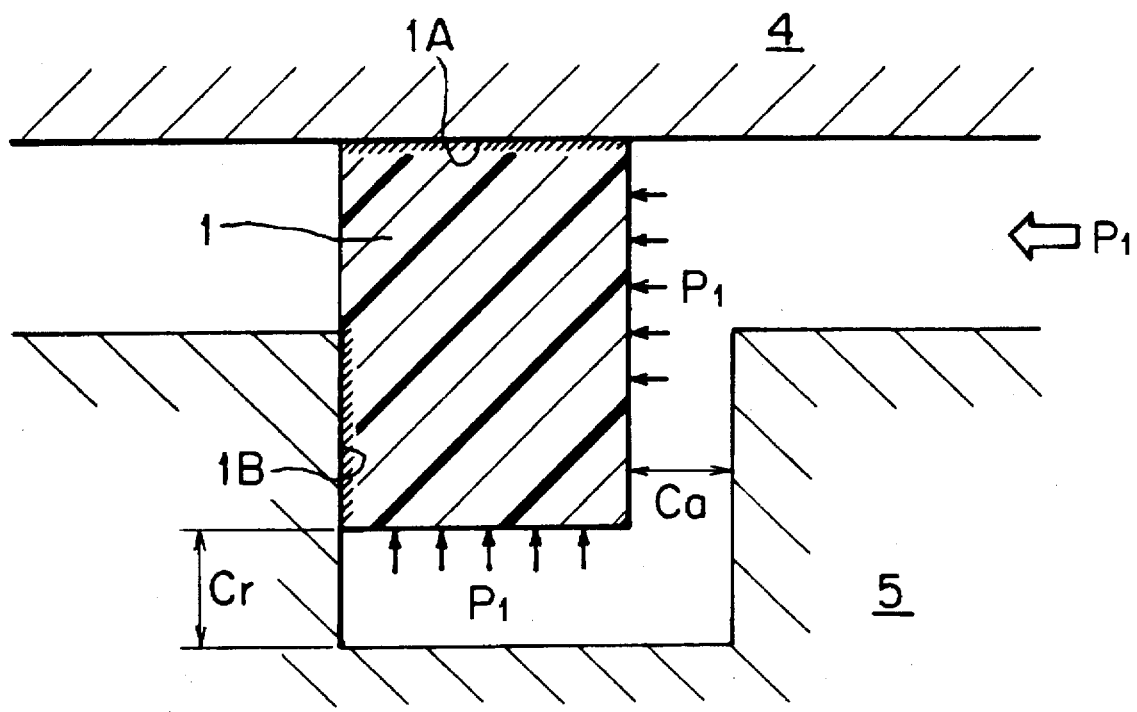
FIG. 7 is an enlarged fragmentary cross-sectional view showing a relation among the housing, a shaft and the shape-retentive resin-made seal ring according to the one embodiment of the present invention.
Figure 8A:
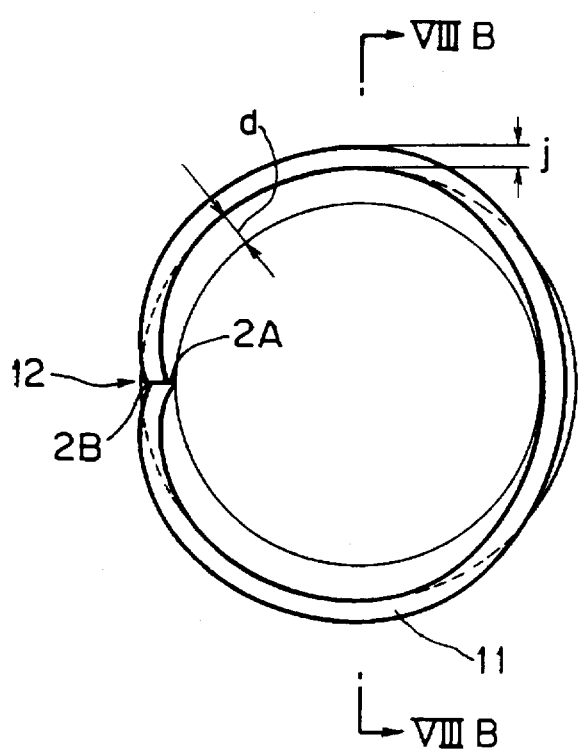
FIG. 8A and FIG. 8B depict the shape of the shape-retentive resin-made seal ring according to the one embodiment of the present invention when fitted on the shaft.
Figure 8B:
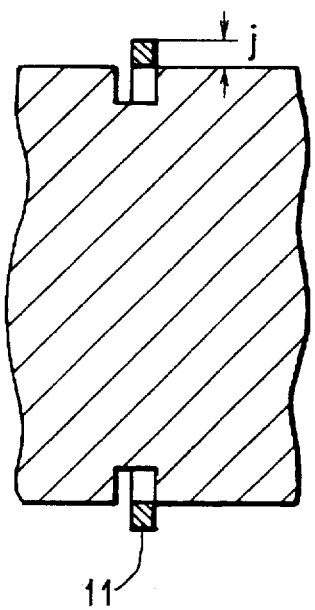

Described specifically, the radial space and the axial space are formed between the seal ring 1 and the bottom wall and one of the side walls of the ring groove 3, respectively, as shown in FIG. 7. When a fluid of a relatively low pressure flows into these spaces, the seal ring 1 is strongly pressed against the housing 4 and the shaft 5, respectively, so that sufficient fluid tightness is retained.

For a piston, a rotating shaft, a reciprocating shaft or the like, the shape-retentive resin-made seal ring 1 can be fitted in a similar manner.

As the seal ring 1 has been imparted with the shape-retentive property so that the portions inside the opposite ends 2A,2B are crossed at the point P as described above, the protrusion of the seal ring 1 can be limited smaller than those of conventional seal rings. The seal ring 1 can therefore be protected from damage upon assembly and moreover, sufficient fluid tightness can be assured between the shaft 5 of the oil pump assembly 17 and the AT housing 4.

Further, as is illustrated in FIG. 1C, the seal ring 1, different from usual resin-made seal rings, can be fitted with smaller ellipticity, in other words, in a form close to a substantially true circle in the ring groove 3.

As a result, the chamfered portion 4A-1 can exhibit significant guiding action upon insertion of the seal ring i along an open edge of the inner peripheral wall of the bore 4A of the housing 4. The seal ring 1 therefore does not encounter any substantial resistance upon the insertion, thereby making it possible to avoid a reduction in its sealing function.

Moreover, while obviating the need for a coating material such as paraffin wax and hence achieving rationalization of the assembly work, the present invention has therefore brought about a seal-ring-protecting effect substantially similar to that available from the use of a coating material like paraffin wax without increasing the manufacturing cost.

We claim:

1. A seal ring, comprising:
   a pair of end portions having a first radius of curvature in a free state of said seal ring, one of said end portions crossing the other of said end portions forming a diverging crossed portion of end portions diverging and extending outwardly in a radial direction of said seal ring in said free state of said seal ring;
   a center portion diametrically opposite said crossed portion, said center portion having a second radius of curvature in said free state of said seal ring;
   a pair of middle portions connecting said pair of end portions and said center portion, respectively, said pair of middle portions having a third radius of curvature larger than said first radius of curvature and said second radius of curvature.

2. A seal ring according to claim 1, wherein said seal ring is symmetrical relative to a line extending between said crossed portion and said center portion.

3. A seal ring according to claim 1, wherein said seal ring is made of synthetic resin imparted with a shape-retentive property.

4. A seal ring, comprising:

a pair of end portions, one of said end portions crossing the other of said end portions forming a diverging crossed portion of end portions diverging and extending outwardly in a radial direction of said seal ring, in said free state of said seal ring;

a center portion diametrically opposite said crossed portion; and a pair of middle portions connecting said pair of end portions and said center portion, respectively, wherein a distance between said crossed portion and said center portion is substantially longer than a distance between said pair of middle portions in a direction perpendicular to a line connecting said crossed portion and said center portion.

5. A seal ring according to claim 4, wherein said seal ring is made of synthetic resin imparted with a shape-retentive property.

\* \* \* \* \*